(12) United States Patent
Mihara et al.

(10) Patent No.: US 9,609,698 B2
(45) Date of Patent: Mar. 28, 2017

(54) MICROWAVE HEATING DEVICE

(71) Applicant: Panasonic Corporation, Kadoma-shi, Osaka (JP)

(72) Inventors: Makoto Mihara, Nara (JP); Tomotaka Nobue, Nara (JP); Yoshiharu Omori, Shiga (JP); Toshiyuki Okajima, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 346 days.

(21) Appl. No.: 14/366,643

(22) PCT Filed: Oct. 12, 2012

(86) PCT No.: PCT/JP2012/006568
§ 371 (c)(1),
(2) Date: Jun. 18, 2014

(87) PCT Pub. No.: WO2013/094095
PCT Pub. Date: Jun. 27, 2013

(65) Prior Publication Data
US 2014/0361009 A1    Dec. 11, 2014

(30) Foreign Application Priority Data

Dec. 20, 2011  (JP) ................ 2011-278081

(51) Int. Cl.
*H05B 6/68*     (2006.01)
*H05B 6/66*     (2006.01)
(Continued)

(52) U.S. Cl.
CPC ............... *H05B 6/68* (2013.01); *H05B 6/66* (2013.01); *H05B 6/666* (2013.01); *H05B 6/76* (2013.01); *H05B 6/80* (2013.01); *Y02B 40/143* (2013.01)

(58) Field of Classification Search
CPC . H05B 6/80; H05B 6/66; H05B 6/666; H05B 6/68; H05B 6/76; Y02B 40/143
(Continued)

(56) References Cited

U.S. PATENT DOCUMENTS 4,904,837 A    2/1990  Low et al.
5,276,300 A    1/1994  Low et al.
(Continued)

FOREIGN PATENT DOCUMENTS

CN    101248706 A    8/2008
EP    2 306 785 A1   4/2011
(Continued)

OTHER PUBLICATIONS

International Search Report of PCT/JP2012/006568, dated Nov. 13, 2012, 2 pages.
(Continued)

*Primary Examiner* — Thien S Tran
(74) *Attorney, Agent, or Firm* — Brinks Gilson & Lione

(57) ABSTRACT

A microwave heating device mountable to an electric device, includes: a commercial power supply; an AC/DC converter which outputs a plurality of DC voltages according to power supplied from the commercial power supply; a controller which receives power from the AC/DC converter and totally controls the electric device; a microwave processing device using a compound semiconductor which receives a plurality of outputs of the AC/DC converter and outputs a microwave; and a plurality of loads connected between, of the DC voltages output from the AC/DC converter, a predetermined
(Continued)

Vd voltage and ground through a plurality of contacts. The loads form a group of electric components in the electric device. The controller controls power supply to the loads, and controls on/off of the contacts to drive the loads by the Vd voltage regardless of the voltage of the commercial power supply.

4 Claims, 5 Drawing Sheets

(51) Int. Cl.
  *H05B 6/76* (2006.01)
  *H05B 6/80* (2006.01)
(58) Field of Classification Search
  USPC ....... 219/702, 703, 706, 709, 710, 716, 718; 307/25, 104, 125
  See application file for complete search history.

(56) References Cited

U.S. PATENT DOCUMENTS

| | | | |
|---|---|---|---|
| 5,548,103 | A | 8/1996 | Morita |
| 5,883,369 | A | 3/1999 | Kim et al. |
| 6,448,541 | B1 | 9/2002 | Lim |
| 2004/0149744 | A1 | 8/2004 | I et al. |
| 2005/0013148 | A1* | 1/2005 | Kunow ............... H02M 3/1584 363/65 |
| 2009/0147413 | A1 | 6/2009 | Aoki |
| 2011/0108548 | A1 | 5/2011 | Nobue et al. |
| 2012/0020119 | A1* | 1/2012 | Tang .................... H02M 1/425 363/21.02 |
| 2012/0061384 | A1* | 3/2012 | Kasai .................... H01L 21/324 219/718 |

FOREIGN PATENT DOCUMENTS

| | | | |
|---|---|---|---|
| GB | 2 241 615 A | | 9/1991 |
| JP | 01-112697 A | | 5/1989 |
| JP | 08-069875 A | | 3/1996 |
| JP | 08-123543 A | | 5/1996 |
| JP | 11283737 A | * | 10/1999 |
| JP | 2004-214191 A | | 7/2004 |
| JP | 2009-295416 A | | 12/2009 |
| TW | 369784 B | | 9/1990 |
| TW | 445754 B | | 7/2001 |
| WO | WO 00/30407 A1 | | 5/2000 |

OTHER PUBLICATIONS

Written Opinion of PCT/JP2012/006568, dated Nov. 13, 2012, in Japanese, 4 pages.
Extended European Search Report in corresponding European Application No. 12860449.3, dated May 4, 2015, 4 pages.
Office Action and Search Report, and English language translation thereof, in corresponding Chinese Application No. 201280062436. 2, dated Apr. 20, 2015, 11 pages.

* cited by examiner

MICROWAVE HEATING DEVICE

This application is a 371 application of PCT/JP2012/006568 having an international filing date of Oct. 12, 2012, which claims priority to JP 2011-278081 filed Dec. 20, 2011, the entire contents of which are incorporated herein by reference.

TECHNICAL FIELD

The present invention relates to a microwave heating device including a microwave processing device that power-amplifies a microwave by using an AC/DC converter as a power supply device, without depending on an input voltage for driving all the electric components in the device by using a voltage applied to the microwave processing device.

BACKGROUND ART

In related art, in all of microwave heating devices of this type, electric devices have been designed for destination places according to the commercial power supply voltages of countries all over the world.

A microwave oven as a related-art microwave heating device commonly configured to: once convert the commercial power supply to a high voltage by a high-voltage boosting transformer; generate a high DC voltage by a voltage doubler rectification circuit; drive a microwave self-oscillation device called a magnetron by the generated high DC voltage to radiate a microwave into a cavity enclosed by a metal; and heat food by dielectric heating by the microwave (for example, see Patent Document 1). At this time, for example, in the case of products for Japan, it is necessary to design the microwave oscillation circuit and select electric components with the input voltage as 100 V AC. In UK, the input voltage is mainly a commercial power supply of 240 V, and it is necessary to make a similar design and electric component selections according to the voltage.

For example, FIG. 5 is an overall circuit diagram of a related-art microwave heating device. The microwave heating device includes a commercial power supply 1 and a safety device 13 for preventing microwave leakage. The safety device 13 includes a fuse 12 disposed on the hot side of a two-port line derived from the commercial power supply 1, a microswitch 10 disposed between the hot line and the cold line on the subsequent stage, and a microswitch 11 disposed on the cold line on the further subsequent stage. The safety device 13 has a fail-safe mechanism so that the microwave does not leak to the outside of the cavity when the door is open. The technical regulation also strictly regulates the model.

On the subsequent stage of the safety device 13, an oven lamp 14, a wave agitating motor 15 and a cooling fan motor 16 are disposed and constitute a plurality of loads 6. For the loads 6, a relay 17, a relay 18 and a relay 19 are disposed in series, respectively, and opening and closing is controlled by a controller 2 whenever necessary. A high-voltage transformer 21 boosts commercial power at it input to a high voltage on the order of Kv as the commercial power. Power charge to the high-voltage transformer 21 is controlled by the opening and closing of a relay 20. The output of the high-voltage transformer 21 undergoes a half-wave voltage doubler rectification by a high-voltage circuit 22 including a diode 23 and a capacitor 24, is converted to a high DC voltage of approximately 7 Kv at the time of startup and of approximately 4 Kv at the time of steady oscillation, and is applied to a magnetron 25, so that a microwave of approximately 2.45 kHz is output.

Patent Document 1: JP-A-H01-112697

SUMMARY OF THE INVENTION

Problem to be Solved by the Invention

However, according to the above-described related-art method, since the safety device 13, the loads 6 and a plurality of contact portions 5 are disposed on the subsequent stage of the commercial power supply 1, it is necessary to select components according to the commercial power supply specification. It is also necessary to select the high voltage for each commercial power supply specification.

Therefore, to realize global manufacturing, it is necessary to make a design and select components for each developed model, and design efficiency is extremely poor.

The present invention solves the above-mentioned related-art problem, and an object thereof is to provide a microwave heating device which can commonly use components irrespective of the specification of the commercial power supply.

Means for Solving the Problem

In order to solve the related-art problem, the present invention provides a microwave heating device mountable to an electric device, including: a commercial power supply; an AC/DC converter which outputs a plurality of DC voltages according to power supplied from the commercial power supply; a controller which receives power from the AC/DC converter and totally controls the electric device; a microwave processing device using a compound semiconductor which receives a plurality of outputs of the AC/DC converter and outputs a microwave; and a plurality of loads connected between, of the DC voltages output from the AC/DC converter, a predetermined Vd voltage and ground through a plurality of contacts, wherein the loads form a group of electric components in the electric device, and wherein the controller controls power supply to the loads, and controls on/off of the contacts to drive the loads by the Vd voltage regardless of the voltage of the commercial power supply.

With this configuration, since all the electric components in the electric device such as the loads and the contacts which drive the loads in the electric device are supplied from the output Vd voltage of the AC/DC converter irrespective of the specification of the commercial power supply, all the electric components and electronic components in the electric device may be commonly used irrespective of the power supply specification, so that not only design efficiency improves but also a universal device that can be used in any place of the whole globe can be provided.

Advantages of the Invention

The microwave heating device of the present invention is configured to radiate a microwave into the cavity by the microwave processing device using a power amplifier of a compound semiconductor such as GaN. Since the microwave processing device is driven by a DC current, the power supply unit is also formed of the AC/DC converter with the commercial power supply as the input. The AC/DC converter has, because of its characteristic, a feature of outputting a desired DC voltage for the voltage specifications of all over the world where the input voltages are 100 V to 240 V.

By making use of this feature, everything related to electric components and electronic components of the device is driven by the output of the AC/DC converter, whereby it is possible to provide a universal device which can be used in any region in the world without depending on the voltage specification.

In addition, since commoditizing of components has ultimately advanced in the aspect of manufacturing of model development, a product that satisfies power supply specifications of many countries can be developed with small human resources.

DETAILED DESCRIPTION OF THE PREFERRED EMBODIMENT

Figure 1:
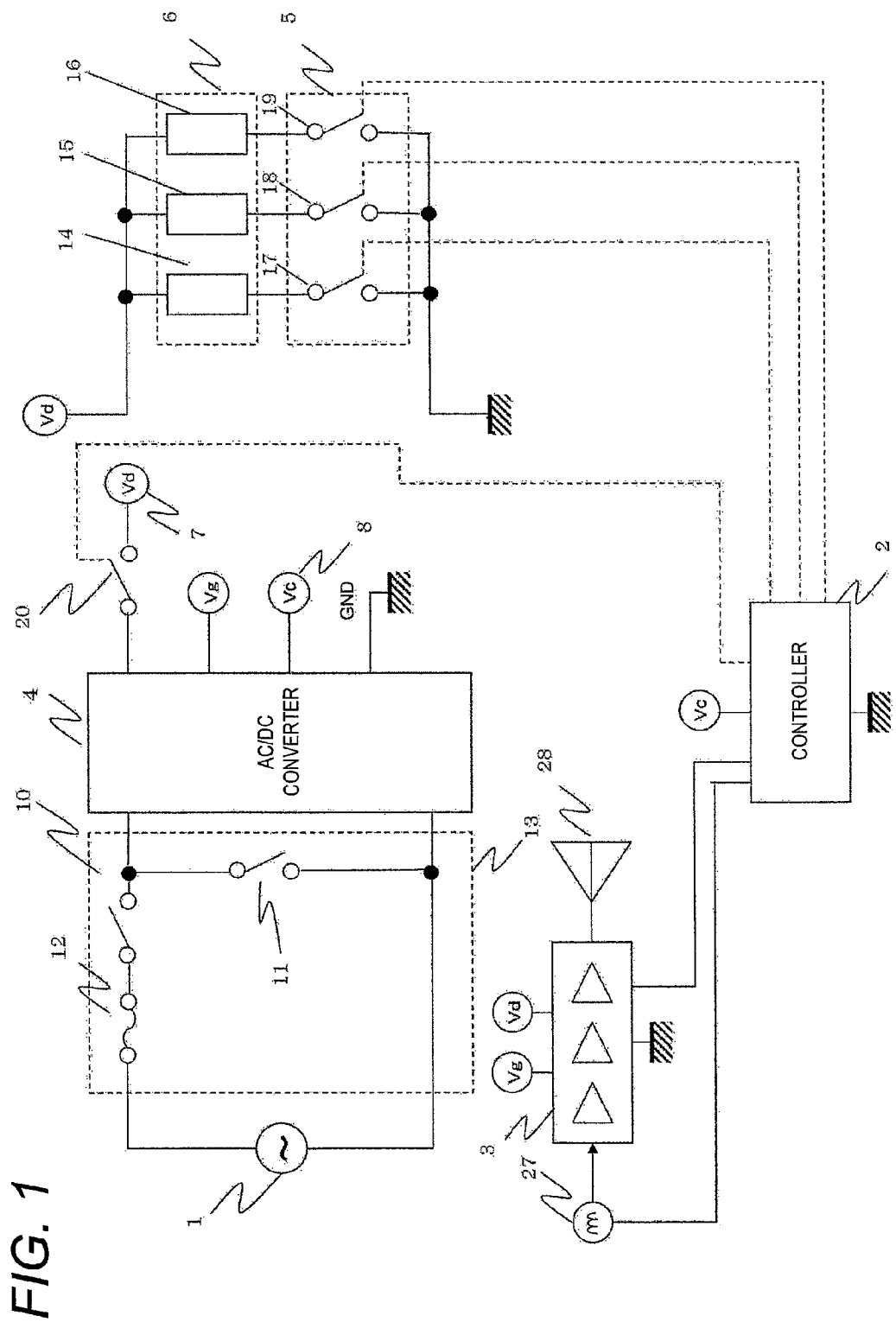
FIG. 1 is a system block diagram of a microwave heating device in a first embodiment of the present invention.

In a first aspect of the invention, there is provided a microwave heating device mountable to an electric device, including: a commercial power supply; an AC/DC converter which outputs a plurality of DC voltages according to power supplied from the commercial power supply; a controller which receives power from the AC/DC converter and totally controls the electric device; a microwave processing device using a compound semiconductor such as GaN which receives a plurality of outputs of the AC/DC converter and outputs a microwave; and a plurality of loads connected between, of the DC voltages output from the AC/DC converter, a predetermined Vd voltage and ground through a plurality of contact portions, wherein the loads form a group of electric components in the electric device, and wherein the controller controls power supply to the loads, and controls on/off of the contact portions to drive the loads by the Vd voltage regardless of the voltage of the commercial power supply. With this configuration, a constant DC voltage can be output irrespective of the commercial power supply voltage from the characteristic of the AC/DC converter, the electric components, the electronic components and the like in the device are operated by the DC voltage, a universal device that can be used in destination places of any power supply voltages is provided, and since exclusive design for each destination place is unnecessary, development efficiency can be improved significantly.

According to a second aspect of the invention, the AC/DC converter has a PFC function. Consequently, the current waveform is rectified infinitely to a sinusoidal form, so that a highly reliable microwave heating device that never provides a malfunction of a peripheral device due to a source voltage distortion can be provided.

According to a third aspect of the invention, the contact portions disposed in series with the loads include contacts of different relays, respectively, and the controller is driven by, of the DC voltages output from the AC/DC converter, a predetermined Vc voltage, and selectively drives the contacts of the relays so as to open or close. Consequently, if the power supply of the AC/DC converter is established, the controller controls the entire device; since this makes the control itself also free from the influence of the power supply voltage, a universal control function can be provided.

According to fourth aspect of the invention, a safety device is further provided and includes: a fuse which prevents microwave leakage when a door provided in the electric device is open; a normally open type microswitch interlocking with the opening and closing of the door; and a normally closed type microswitch interlocking with the opening and closing of the door, and the safety device is disposed on a preceding stage of the AC/DC converter. Consequently, a safety device having a mechanical mechanism can be formed between a hot line and a cold line of the commercial power supply without the voltage of the AC/DC converter being switched between on and off, so that an extremely highly reliable microwave heating device can be provided.

Hereinafter, an embodiment of the present invention will be described with reference to the drawings. It is to be noted that the present invention is not limited by this embodiment.

First Embodiment

FIG. 1 shows a relevant part block diagram of a microwave heating device in a first embodiment of the present invention.

In FIG. 1, a commercial power supply 1 supplies power to a microwave heating device mountable to an electric device. A safety device 13 includes a fuse 12, a microswitch a 10 the contact of which is closed by the closing of the door and a microswitch b 11 the contact of which is opened by the closing of the door. In this safety device 13, when the door is opened, the microswitch a 10 is opened to become open, so that the circuit network is interrupted and the power of the commercial power supply 1 is not transmitted to the subsequent stage. On the other hand, the microswitch b 11 is closed and has no influence on the circuit network.

Conversely, when the door is closed, the microswitch a 10 is closed and power is supplied to the subsequent stage. As the safety device 13, in addition to this safety mechanism of the microswitch a 10 and the microswitch b 11 interlocking with the door opening and closing, when the door is opened in the event that the contact of the microswitch a 10 is fused, since the microswitch b 11 is closed, an excessive current flows because of a short circuit among the commercial power supply 1, the fuse 12 and the fused microswitch a 10 to cause self-interruption of the fuse 12; for this reason, the safety device is an extremely strict one providing double protection against microwave leakage to the outside which device is also subject to the model regulation from the viewpoint of the technical regulation and is a structure essential to microwave heating devices.

On the subsequent stage of the safety device 13, an AC/DC converter 4 is disposed, and creates a Vd voltage 7, a Vg voltage and a Vc voltage 8 by a function described later. The loads 6 constituted by the oven lamp 14, the wave agitating motor 15 and the cooling fan motor 16 and the contact portions 5 constituted by a relay a 17, a relay b 18 and a relay c 19 are connected in series between the Vd voltage 7 and ground, and are supplied with power through a relay d 20. The controller 2 driven by the Vc voltage 8 controls the opening and closing of the contact portions 5 and control parameters of a microwave processing device 3 and an oscillator 27. The power of the commercial power supply 1 controlled as described above is radiated into the cavity from an antenna 28 as a microwave output. On the other hand, the source of power supply to the loads in the device is controlled by the controller 2 selectively opening or closing the relay d 20.

The oscillator 27 outputs a reference signal of 2.45 GHz, and is capable of controlling a reference frequency by an external control signal. The signal is weak power and not more than 0 dBm. In the microwave processing device 3, a plurality of stages of amplifiers are connected in cascade, and a microwave output of several hundreds W is output to the antenna 28. The inside is formed of power amplifiers made of a compound semiconductor such as GaN, the amplifiers are normally OFF, and the gate voltage is a negative voltage. The Vd voltage 7 is several tens of V, and the Vg voltage is minus several V. From the fact that the magnetron which is known oscillation means is approximately 7 kV at the time of startup and approximately 4 kV at the time of steady oscillation, it can be said that this is an extremely safe device.

Here, the AC/DC converter 4 is capable of outputting a desired voltage without depending on the input voltage since it performs negative feedback control of the output voltage with a given reference voltage and an error amplification circuit. By this action, the Vd voltage 7, the Vc voltage 8 and the Vg voltage can be output with high accuracy. Although obvious, there is a great advantage in that common components can be selected for any power supply specification since the loads 6 and the contact portions 5 driven by the Vd voltage 7 not depending on the input voltage do not depend on the input voltage, either. Moreover, the controller 2 and the microwave processing device 3 have no dependence on the input voltage, either, since they are driven by a voltage created by the AC/DC converter 4.

Therefore, since devices that can be used in countries all over the world can be developed by performing only one design development, universal devices can be manufactured, and since a local design conforming to the power supply specification of each country is absolutely unnecessary, design efficiency can be improved significantly.

Figure 2:
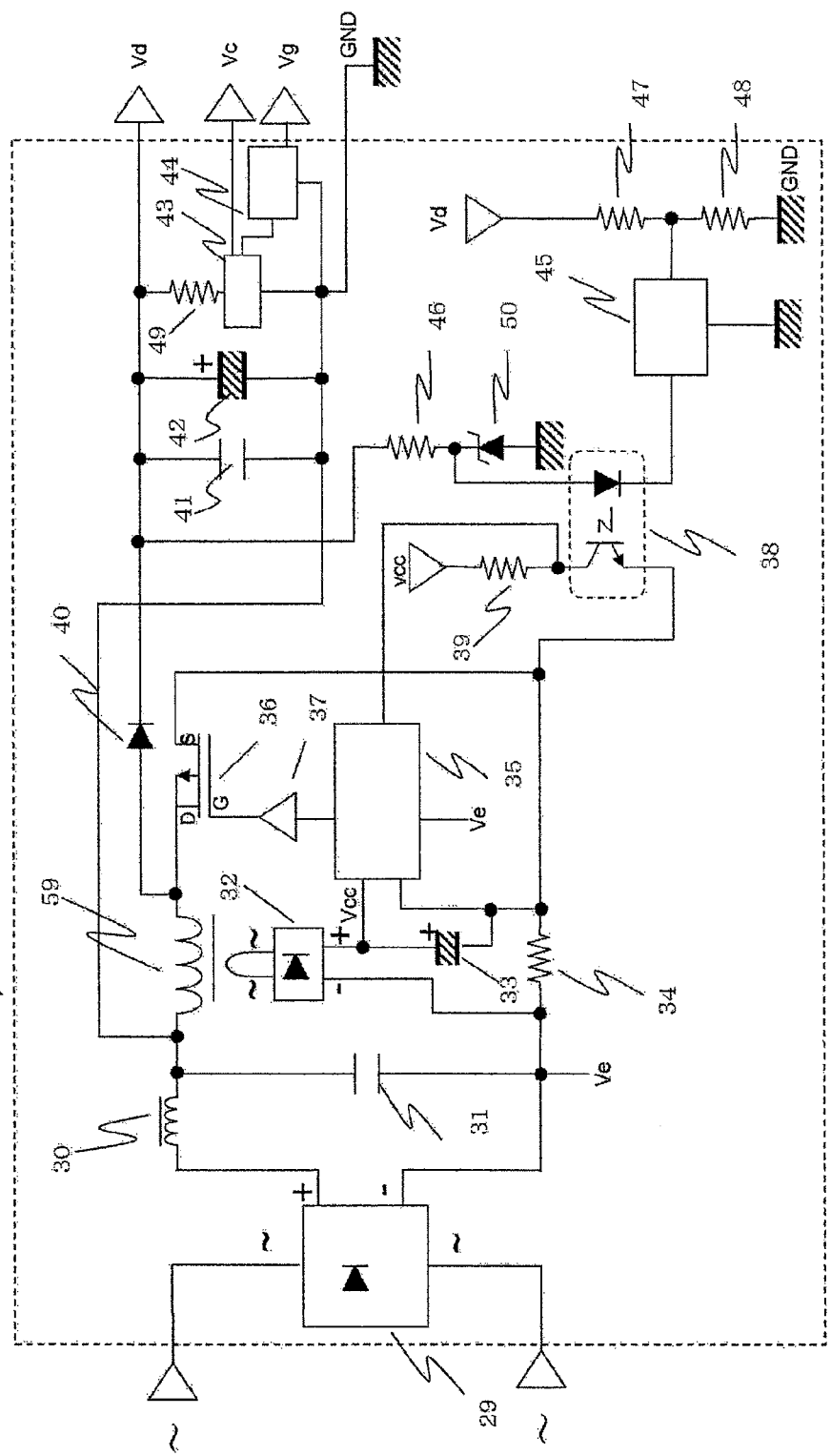
FIG. 2 is a circuit diagram of an AC/DC converter in the first embodiment of the present invention.

Now, the AC/DC converter 4 will be described by using FIG. 2. FIG. 2 is a circuit diagram of the AC/DC converter in the first embodiment of the present invention.

The commercial power supply 1 is converted to a unidirectional power supply by a diode bridge 29. The unidirectional power supply has the current and the voltage smoothed by a filter circuit including a choke coil 30 and a smoothing capacitor 31. Through an energy diode 40 stored by an energy storage coil 59, energy is transmitted to the circuit on the subsequent stage. When a power MOSFET 36 is on, current flows through the energy storage coil 59 in a closed loop and energy of ½ Li² is stored. When the power MOSFET 36 is turned off, energy is transmitted to the circuit on the subsequent stage through the energy diode 40. When the power MOSFET 36 is turned on, the energy diode 40 is cut off to be insulated from the preceding switching circuit.

A control IC 35 transmits an ON/OFF PWM signal to the gate of the power MOSFET 36 through a driver 37. Substantially in a valley part of the input voltage, the ON signal is prolonged, in a peak part where energy is intentionally drawn, the ON signal is, conversely, shortened to reduce the drawing of energy, and energy is stored in a circuit subsequent to the cathode of the energy diode 40 having transmitted energy to the subsequent stage. The control IC 35 is driven by a DC voltage Vcc obtained by smoothing, by an electrolytic capacitor 33, the unidirectional voltage obtained from a compound-wound circuit of the energy storage coil 59 through a diode bridge 32. The control IC 35 detects a voltage drop due to a circuit current flowing through a shunt resistance 34, and detects the value of the circuit current.

The AC/DC converter 4 obtains the Vd voltage 7 by storing the energy transmitted from the energy storage coil 59 through the energy diode 40 by an electrolytic capacitor 42 and a bypass capacitor 41. Further, the AC/DC converter 4 obtains the Vc voltage 8 by passing current to a DC/DC converter 43 through a resistance 49. Moreover, the AC/DC converter 4 obtains the negative voltage Vg by a charge pump circuit 44 by using a switching signal of the DC/DC converter 43.

Moreover, the output voltage preferably has a smooth waveform having as few ripples as possible. The Vd voltage 7 is divided by a resistance 47 and a resistance 48 and input to a control IC 45. The reference voltage is created by a resistance 46 and a zener diode 50, and when the divisional voltage of the Vd voltage exceeds the reference voltage inside the control IC 45, the cathode of the diode of a phototransistor 38 is directly coupled to ground to pass current, so that the diode emits light. Then, the transistor of the phototransistor 38 is turned on, and a voltage substantially equal to a Ve voltage is input to the control IC 35. Then, control is performed so that the ON duration of the PWM signal shortens according to the logic of the control IC 35, and the Vd voltage 7 is fed back to modify the voltage so as to decrease.

Conversely, when the divisional voltage of the Vd voltage becomes lower than the reference voltage inside the control IC 45, the diode of the phototransistor 38 is cut off to turn off the transistor of the phototransistor 38, so that the Vcc voltage is applied to the control IC 35. Then, control is performed so that the ON duration of the PWM signal is prolonged according to the logic of the control IC 35, and the Vd voltage 7 is fed back to modify the voltage so as to increase. In this way, the output voltage of the AC/DC converter 4 is regulated.

As described above, since the electric components and the electronic components in the device are all loads of the AC/DC converter 4, a device can be obtained that has a structure free from the influence of the specification of the commercial power supply.

Only the microswitch b 11 necessarily satisfies the power supply specifications of 100 V (Japan) to 240 V (UK). Since except this, common components adapted to the Vd voltage are used without any consideration of the power supply specifications whether in Japan or in UK, once a platform of one model is created, it can be used in any country in the world. For this reason, universal devices that can be used in any country can be developed.

Moreover, for adaptation to destination countries, since the fringe design related to the power supply specification is absolutely unnecessary, development efficiency can be improved significantly, development convenience, and although recent globalization forces assignments to countries all over the world, with this device, in the case of an overseas transfer, the device can be used as it is only by conveying it, which makes usability very excellent.

Moreover, since the controller that controls the entire device is also driven by the Vc voltage 8 of the AC/DC converter 4, if this power supply is established, control of all the other loads becomes possible, and since this makes the control itself also free from the influence of the power supply voltage, a universal control function can be provided.

Moreover, by adopting a structure in which the safety device including the fuse that prevents microwave leakage when the door is open, the normally open type microswitch a 10 interlocking with the opening and closing of the door and the normally closed type microswitch b 11 also interlocking with the opening and closing of the door is disposed on the preceding stage of the AC/DC converter 4, a safety device having a mechanical mechanism can be formed between the hot line and the cold line of the commercial power supply without the voltage of the AC/DC converter 4 being switched between on and off, so that an extremely highly reliable microwave heating device can be provided.

Figure 3:
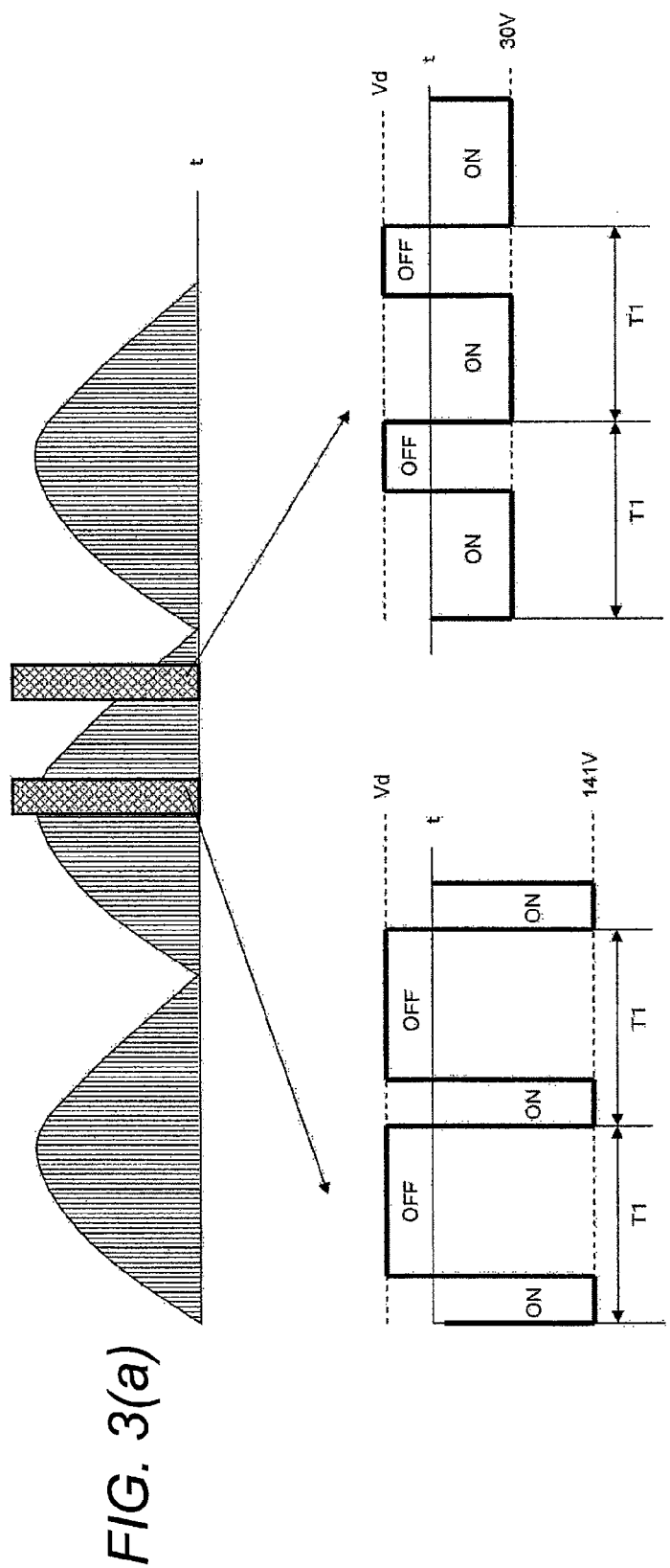
FIGS. 3(a) to 3(c) are voltage operation principle views of an energy storage coil in the first embodiment of the present invention.

This AC/DC converter 4 is provided with a PFC (power factor correction) function. This operation mechanism will be described by using FIG. 3 and FIG. 4. FIG. 3 is voltage operation principle views of the energy storage coil in the first embodiment of the present invention, and FIG. 4 is current operation principle views of the energy storage coil in the first embodiment of the present invention.

FIG. 3(*a*) is an overall waveform chart showing the voltage across the energy storage coil 59. Although the envelope has a form of the commercial power supply that is full-wave rectified, the local waveform is a switching waveform of approximately 80 kHz (1/T1). A peak part of the envelope of the mesh hunting that is enlarged to view the waveform is FIG. 3(*b*). In this period, since it is unnecessary to store too much energy since the voltage is high, the ON period of the power MOSFFT 36 is short. On the other hand, taking a look at FIG. 3(*c*) where the mesh hunting of a valley part is enlarged, since the circuit current envelope does not become sinusoidal unless much energy is stored since the voltage amplitude is small contrary to the peak part, control is performed so that an abundant ON period is secured to forcibly pass current.

Figure 4:
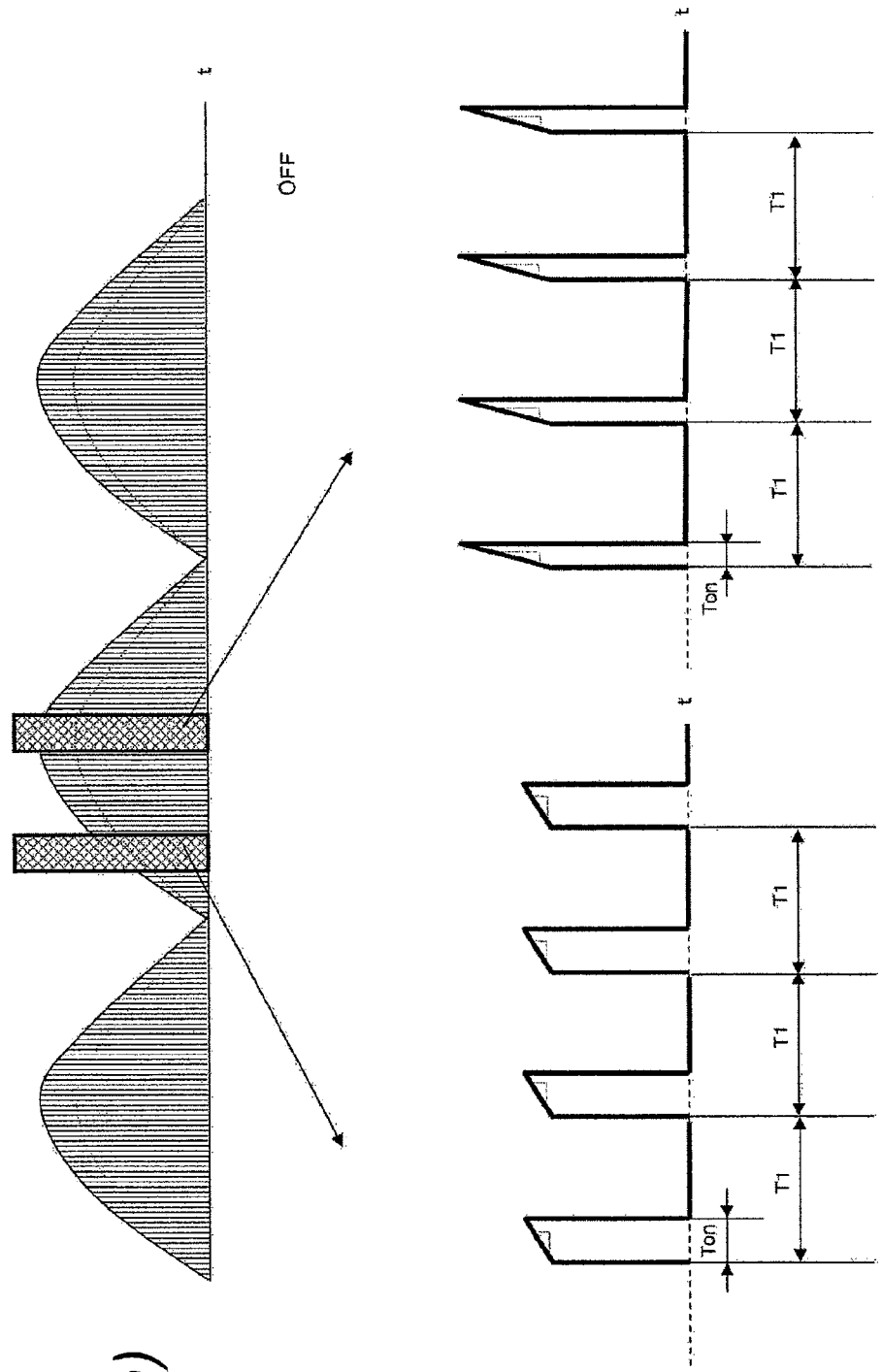
FIGS. 4(a) to 4(c) are current operation principle views of the energy storage coil in the first embodiment of the present invention.
Figure 5:
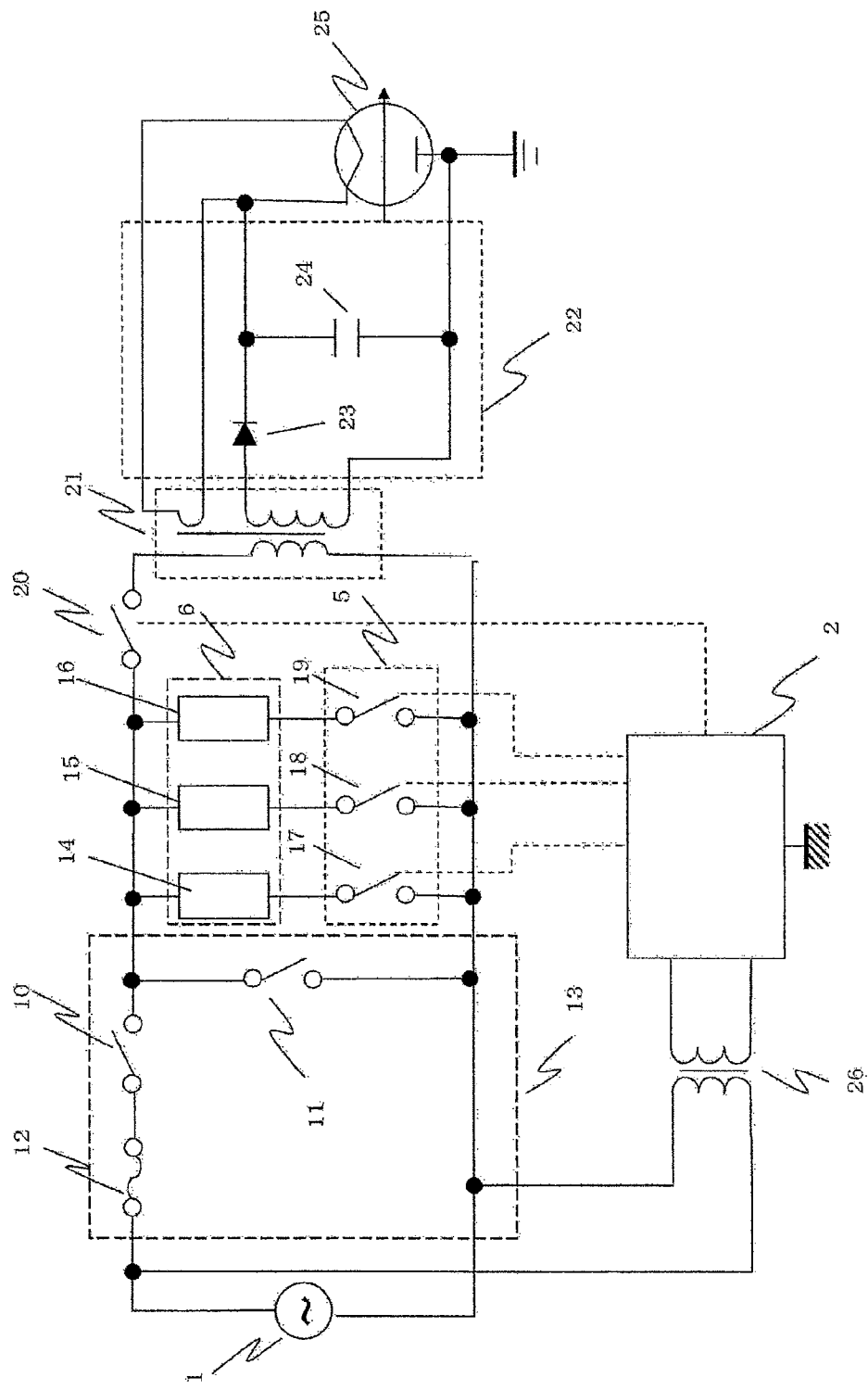
FIG. 5 is a system block diagram of the related-art microwave heating device.

On the other hand, the current flowing through the energy storage coil 59 is shown in FIG. 4. FIG. 4(*a*) is the overall envelope waveform. FIG. 4(*b*) is an enlarged view of a local part of a valley, and although the frequency is the same and approximately 80 kHz (1/T1), the Ton time is long. FIG. 4(*c*) is an enlarged view of a local part of a peak part, and compared with FIG. 4(*b*), the ON period is substantially halved to suppress the energy stored into the energy storage coil 59.

By thus controlling the ON period of the PWM signal according to the amplitude of the envelope waveform, the envelope waveform can be modified to a sinusoidal form. By passing this current through the filter of the choke coil 30 and the smoothing capacitor 31, a high-frequency component is removed to obtain a clear sinusoidal current waveform.

By doing this, the problem of the waveform distortion of the general power supply due to flow of harmonic current through the current distribution network does not occur and a highly reliable device can be provided.

The present application is based upon Japanese Patent Application (No. 2011-278081) filed on Dec. 20, 2011, the contents of which are incorporated herein by reference.

INDUSTRIAL APPLICABILITY

As described above, in the microwave heating device according to the present invention, since all the electric components and electronic components in the device are driven by the output voltage of the AC/DC converter except for the safety device that prevents microwave leakage, commoditizing of components epochally advances without subjected to the influence of the commercial power supply. Moreover, since the input specification of the AC/DC converter is compatible with voltages of countries all over the world in principle, although a single device, use development to universal devices that can be used in countries all over the world becomes possible.

The invention claimed is:

1. A microwave heating device mountable to an electric device, the microwave heating device comprising:
    a commercial power supply;
    an AC/DC converter which outputs a plurality of DC voltages according to power supplied from the commercial power supply;
    a controller which receives power from the AC/DC converter and totally controls the electric device;
    a microwave processing device using a compound semiconductor which receives a plurality of outputs of the AC/DC converter and outputs a microwave; and
    a plurality of loads connected between a predetermined Vd voltage of the DC voltages output from the AC/DC converter and a ground connection through a plurality of contacts,
    wherein the loads comprise a group of electric components in the electric device, and
    wherein the controller controls a power supply to the loads, and controls an on/off state of the contacts to drive the loads by the Vd voltage regardless of the voltage of the commercial power supply.

2. The microwave heating device according to claim 1, wherein the AC/DC converter has a power factor correction function.

3. The microwave heating device according to claim 1, wherein the contacts are disposed in series with the loads and comprise contacts of different relays, respectively, and wherein the controller is driven by a predetermined Vc voltage of the DC voltages output from the AC/DC converter, and selectively drives the contacts of the relays so as to open or close the contacts.

4. The microwave heating device according to claim 1, further comprising:
    a safety device comprising:
    a fuse which prevents microwave leakage when a door in the electric device is open;
    a normally open type microswitch interlocking with the opening and closing of the door; and
    a normally closed type microswitch interlocking with the opening and closing of the door,
    wherein the safety device is on a preceding stage of the AC/DC converter.

* * * * *